(12) United States Patent
Hartmann

(10) Patent No.: US 7,614,665 B2
(45) Date of Patent: Nov. 10, 2009

(54) PLUG-IN CONNECTOR FOR TUBE AND HOSE LINES WITH REINFORCED MATERIAL CROSS-SECTION

(75) Inventor: Harald Hartmann, Dornbirn (AT)

(73) Assignee: Henn GmbH & Co. KG, Dornbirn (AT)

( * ) Notice: Subject to any disclaimer, the term of this patent is extended or adjusted under 35 U.S.C. 154(b) by 192 days.

(21) Appl. No.: 10/575,598

(22) PCT Filed: Feb. 26, 2004

(86) PCT No.: PCT/EP2004/001886

§ 371 (c)(1),
(2), (4) Date: Feb. 14, 2007

(87) PCT Pub. No.: WO2005/047751

PCT Pub. Date: May 26, 2005

(65) Prior Publication Data

US 2007/0236013 A1   Oct. 11, 2007

(30) Foreign Application Priority Data

Oct. 15, 2003  (DE) .................................. 103 47 929

(51) Int. Cl.
*F16L 37/088* (2006.01)
(52) U.S. Cl. .................................................... 285/321
(58) Field of Classification Search ................. 285/321
See application file for complete search history.

(56) References Cited

U.S. PATENT DOCUMENTS

| | | | |
|---|---|---|---|
| 2,084,431 A * | 6/1937 | Catley ......................... 285/314 |
| 3,177,018 A | 4/1965 | Goodwin |
| 5,273,323 A | 12/1993 | Camettes et al. |
| 5,431,454 A * | 7/1995 | Calmettes et al. ............... 285/3 |
| 5,536,047 A * | 7/1996 | Detable et al. ................. 285/39 |
| 5,855,399 A | 1/1999 | Profunser |
| 6,983,958 B2 * | 1/2006 | Rautureau .................... 285/305 |
| 6,997,486 B2 * | 2/2006 | Milhas ........................ 285/305 |
| 7,201,403 B2 * | 4/2007 | Takayanagi et al. ......... 285/321 |
| 7,338,092 B1 * | 3/2008 | Cicconi, III ................. 285/305 |
| 7,387,318 B2 * | 6/2008 | Yoshida ...................... 285/321 |
| 7,393,019 B2 * | 7/2008 | Taga et al. ................... 285/321 |
| 7,438,328 B2 * | 10/2008 | Mori et al. .................. 285/305 |

FOREIGN PATENT DOCUMENTS

| | | |
|---|---|---|
| CA | 1269 683 | 5/1990 |
| DE | 691 02 241 T2 | 9/1994 |
| DE | 197 40 649 A1 | 3/1999 |
| DE | 197 43 825 A1 | 4/1999 |
| EP | 0559 505 | 9/1993 |

* cited by examiner

*Primary Examiner*—James M Hewitt
(74) *Attorney, Agent, or Firm*—Norris McLaughlin & Marcus, PA; Christa Hildebrand

(57) ABSTRACT

A plug-in connection for pipe and hose lines with a reinforced material cross-section. The connection includes a nozzle that forms at least one catch shoulder and a connector that can be engaged with the nozzle and has at least one catch spring with legs, the latter locking behind at least one of the catch shoulders of the nozzle. In order for the connector to absorb high insertion and axial pulling forces, a double wall is disposed at least in the vicinity of the catch spring openings.

7 Claims, 3 Drawing Sheets

PLUG-IN CONNECTOR FOR TUBE AND HOSE LINES WITH REINFORCED MATERIAL CROSS-SECTION

BACKGROUND OF THE INVENTION

The invention is directed to a plug-in connection for pipe and hose lines with reinforced material cross-section including a nozzle, which forms at least one catch shoulder, and a plug which can latch with the nozzle, the plug supporting at least one catch spring with catch legs which latch behind at least one of the catch shoulders of the nozzle.

A plug-in connection of this type is disclosed, for example, in EP 0 750 152 B1 by the same applicant. The entire content of this document is included in the presently disclosed invention.

The plug of conventional plug-in connections includes an inner sleeve and an outer sleeve oriented parallel to the inner sleeve, with the inner sleeve and the outer sleeve connected to each other in the region of a sealing ring.

A receiving space for insertion of a hose is formed between the two sleeves. The plug in the conventional embodiment is already formed with two walls in the region of the sealing ring.

It has been observed that the latching connection must be able to absorb relatively high insertion forces and axial pulling forces, in particular in the region of the catch spring and of the catch shoulder arranged opposite from the catch spring.

The latching shoulder in EP 0 750 151 B1 is formed in the region of the single-wall outer sleeve in connection with a catch spring opening disposed in the region of the nozzle.

Application of high separation forces to the plug-in connection poses the risk that the region of the catch spring opening facing the plug can fracture or even tear off in the region of the outer sleeve, which may cause the plug-in connection to disengage.

It is therefore an object of the invention to modify a plug-in connection of the aforedescribed type so that it can withstand significantly higher holding forces.

BRIEF SUMMARY OR THE INVENTION

This object is solved by the invention in that the plug is formed with the double walls at least in the region of the catch spring openings.

According to a modification of the invention, the double walls provided at least in these regions have a relatively are mutually parallel and closely spaced.

According to a preferred embodiments of the double walls arranged at least in the region of the openings, the double walls are preferably squeezed together in the region of these openings, and are spaced farther outside the region of the openings, where they also extend parallel and are connected with each other by an end wall oriented in the radial direction.

According to the technical teachings of the invention, the catch spring openings are advantageously material-reinforced, because the inner and outer sleeve of the plug overlap at least in this region and form closely spaced parallel double walls.

This has the additional advantage that the double walls arranged in the region of the catch spring openings expand rearward in the axial direction to form a corresponding ring-shaped receiving space suitable for insertion of a hose.

Although this particular hose receiving space is already known from EP 0 750 152 B1 by the same applicant, this receiving space, however, is therein not formed by double-wall cross-sections, but only by aligning an inner and outer sleeve in parallel with each other.

According to the invention, this receiving space for the hose is turned-up toward the front and squeezed together, which makes the receiving space significantly more resistant to spreading.

The receiving space is therefore better protected against radial expansion or spreading than the space disclosed in EP 0 750 152 B1.

In that document, the outer sleeve contacted the outer periphery of the hose in the region of the catch spring openings, so that the outer sleeve was supported by the hose, shoring up the connection.

Conversely, the catch spring opening in the present invention is unsupported and is therefore advantageously formed with the double walls. This has the advantage that in the region of the catch spring openings, a high rigidity is obtained with a relatively thin material cross-section. This was not the case in EP 0 750 152 B1 where relatively large material cross-sections had to be used to form the latching shoulder. Moreover, the material in the region of the catch spring opening in the nozzle and in the plug had to be reinforced in particular, which resulted in comparatively high manufacturing costs.

With the invention, a superior rigidity is advantageously achieved with significantly thinner material cross-sections in the region of the catch spring openings, giving the plug-in connection a higher holding force with smaller material cross-sections.

Providing the plug-in connection in the region of the catch spring openings with double walls has the additional advantage that the front face of the plug according to the invention is formed with double walls, which eliminates sharp edges that can cause cuts and other injuries, as may have been the case in EP 0 750 152 B1, because the single, upwardly bent edges disclosed therein had the potential to cause injuries.

The subject matter of the invention is not limited to the features recited in the individual claims, but also includes features from a combination of the individual claims.

All information and features disclosed in the documents, including in the abstract, in particular the three-dimensional arrangements shown in the drawings, are to be considered an essential part of the invention, as far are they are novel, either alone or in combination.

Exemplary embodiments of the invention will now be described with reference to the drawings. The drawings and their description include additional features and advantages of the invention.

BRIEF DESCRIPTION OF THE DRAWINGS

It is shown in.

DETAILED DESCRIPTION OF THE INVENTION

Figure 1:
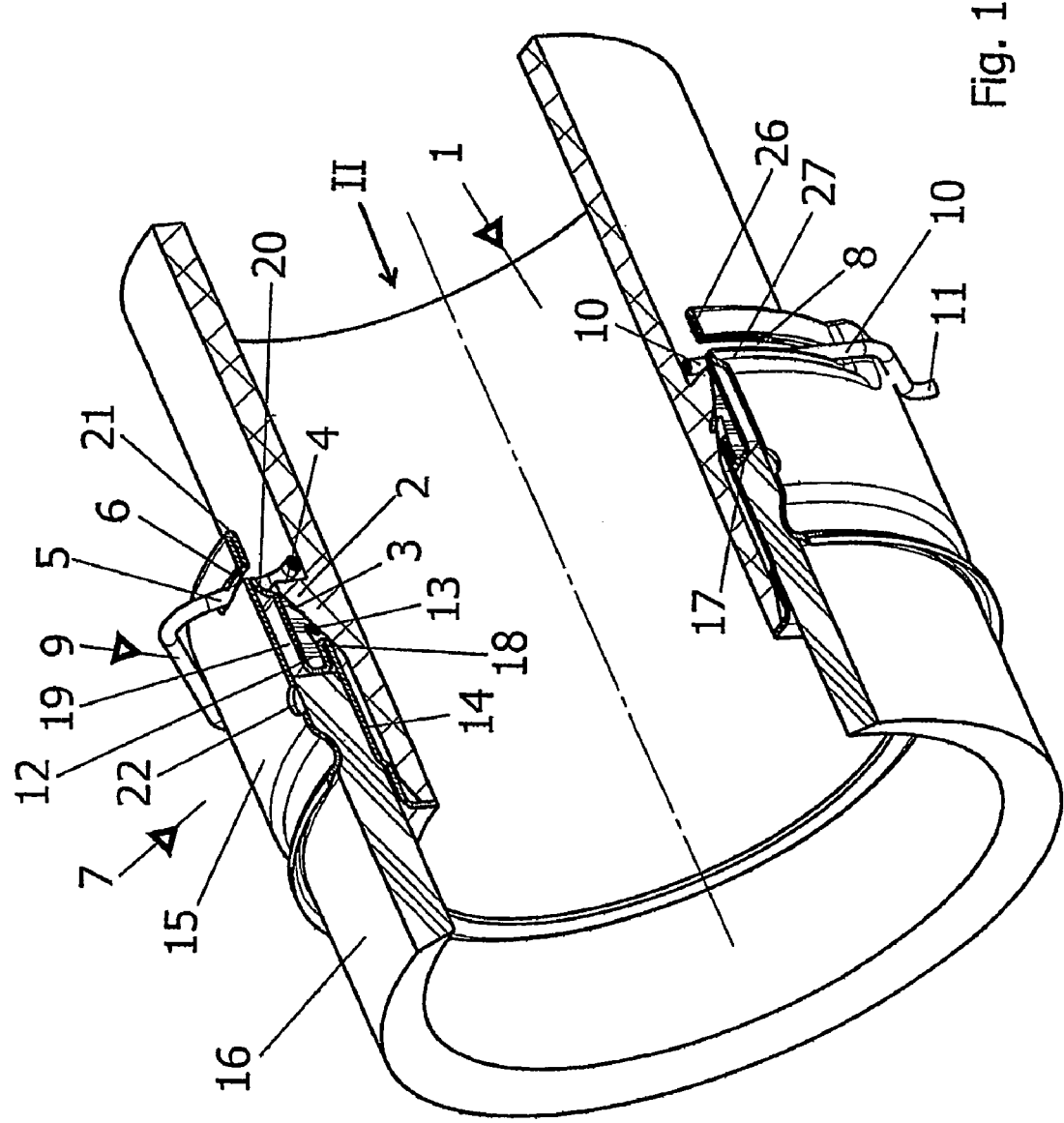
FIG. 1 is a partial section through a plug-in connection according to the invention.

As shown in FIG. 1, a nozzle 1 which can be made, for example, of metal or a plastic material, is inserted into a plug 7 and latched.

The nozzle 1 includes essentially a cylindrical sleeve, with a catch shoulder 2 formed on the outer periphery of the cylindrical sleeve. The catch shoulder 2 forms in the insertion direction a front inclined surface 3 which transitions rearward into a latching surface 4.

Latching with the plug 7 is achieved in that the plug 7 is connected with an approximately U-shaped catch spring 9 which forms a total of three different latching locations.

Two opposing latching locations are formed by the mutually parallel catch legs 10 of the U-shaped catch spring 9.

The catch legs 10 of the catch spring 9 protrude through mutually parallel catch spring openings 8 in the plug 7. Corresponding outwardly bent spring ends 11 are formed on the respective free front ends of the catch legs 10.

A third center latching location is formed by a detent clip 5 which protrudes through an associated catch spring opening 6 in plug 7. The detent clip 5 faces the inclined surface 3 of the catch shoulder 2 of the nozzle 1 and latches behind the catch shoulder 2.

The seal of the plug-in connection is formed by a sealing ring 12 installed in plug 7. The sealing ring 12 has a downwardly angled sealing lip 13 which sealingly contacts the inclined surface 3 of the catch shoulder 2.

According to the invention, the plug 7 includes an essentially axial inner sleeve 14 which forms the inner receiving surface for a hose 16. The inner sleeve 14 transitions in the insertion direction into a turned-up edge 18 which forms a receiving space for receiving the base flange of the sealing ring 12.

The receiving space for this base flange is bounded at the top by a cylindrical stop surface 19 of the inner sleeve, which in turn transitions via an inclined surface 20 into the double wall 21 which is located at the front in the axial direction.

The inner sleeve is turned-up in the region of the double wall 21 and continues as an outer sleeve 15.

The intermediate space between the inner sleeve 14 and the outer sleeve 15 is used as receiving space for the hose 16 which is inserted to a stop edge 17 on the receiving space for the sealing ring 12, wherein makes contact.

The outer sleeve 15 has inspection holes 22 distributed on the diameter and allowing inspection of the hose to verify that the hose 16 has been inserted far enough into the receiving space between the inner sleeve 14 and the outer sleeve 15.

Figure 2:
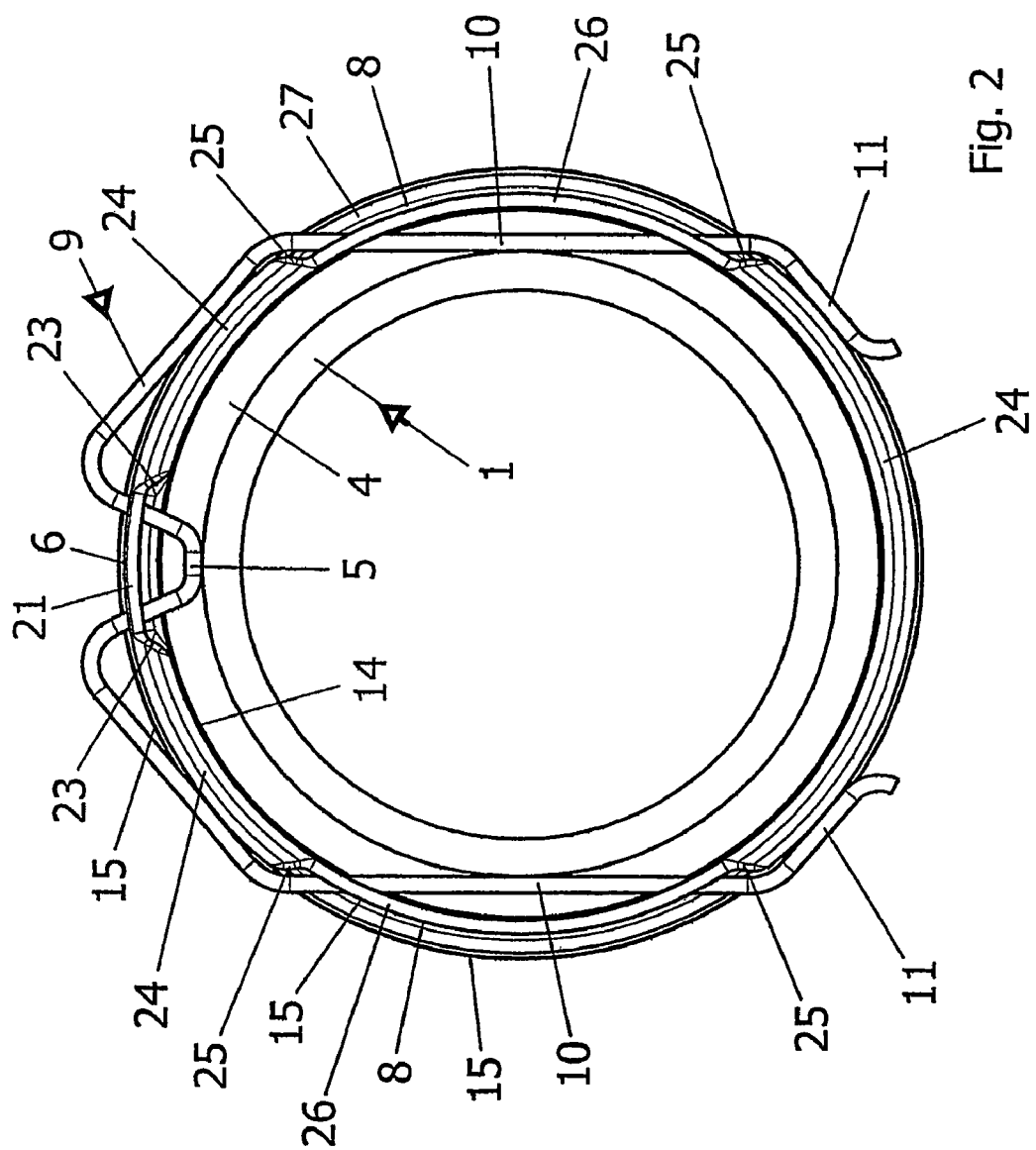
FIG. 2 is a front view of the plug-in connection in the direction of arrow II in FIG. 1.
Figure 3:
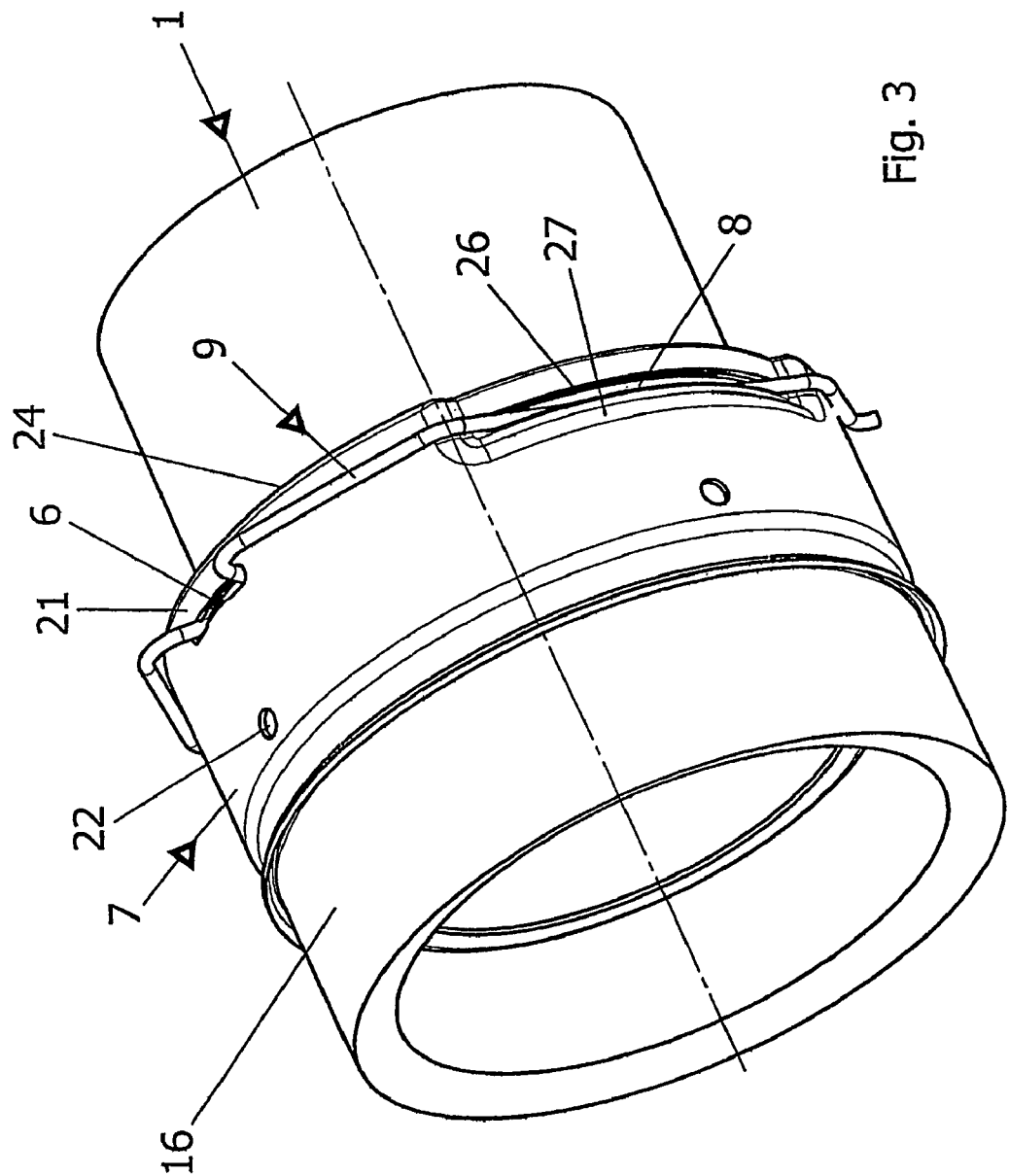
FIG. 3 is a prospective side view of the plug-in connection according to FIGS. 1 and 2.

It is important that the double wall 21 is squeezed together in the region of the catch spring opening 6, as shown as a front view in FIG. 2. The double wall 21 widens across laterally adjoining transition regions 23 into the mutually parallel spaced-apart inner sleeve 14 and outer sleeve 15, whereby this region is connected by an end wall 24.

The end wall 24 again decreases in the region of the catch spring openings 8 for the catch legs 10 via the transition regions 25 into a squeezed-together double wall 26, with this shape existing only over the length of the catch spring opening 8. This is followed by the transition region 25, which transitions into the end wall 24 with a larger area.

Double walls (with the double wall 21 and 26) are formed not only on the right side of the respective catch spring opening 6, 8, but also on the left side, as evidenced by the shoulder 27 in FIGS. 1 and 2.

This shoulder forms of the transition region between the inner and outer sleeve in the region of the openings 6, 8.

This results in a narrow cross-section of the double wall 26 which is therefore capable of transferring a particularly high load, because the outer sleeve 14 and the inner sleeve 15 are closely spaced in this region and therefore capable of transferring the load.

Compared to the older invention disclosed in EP 0 750 152 B1, the material cross-section of the starting sheet metal from which the plug 7 is fabricated, could be reduced by 60%, while simultaneously significantly increasing the holding force of the plug-in connection.

Those skilled in the art will understand that the afore-described plug-in connection with double walls can also be manufactured as a plastic part, whereby the plug 7 and the hose 16 can be formed as a single plastic part.

Accordingly, the plug 7 need not be deep-drawn from a metal part, but can also be made by an injection molding process.

The invention claimed is:

1. A plug-in connection for connecting pipes or hoses, comprising
    a nozzle having at least one catch shoulder, and
    a plug adapted to interfit with the nozzle and including an inner sleeve and an outer sleeve, said inner sleeve being spaced apart from and substantially parallel to the outer sleeve, wherein the plug further includes at least one opening extending through the inner and outer sleeves, and a catch spring having legs adapted to protrude inwardly through the at least one opening and latch behind the at least one catch shoulder of the nozzle,
    wherein the inner sleeve and the outer sleeve are joined at an end of the plug facing the nozzle by a material connection, thereby enabling the inner and outer sleeves to withstand a high static and dynamic pulling force; and
    wherein the inner sleeve and the outer sleeve form a double wall at least in a region proximate to the at least one opening, said double wall in the proximate region being formed by squeezing together the inner sleeve and the outer sleeve.

2. The plug-in connection of claim 1, wherein a spacing between the inner sleeve and the outer sleeve is smaller in a region proximate to the at least one opening than in a region away from the at least one opening, and wherein the inner sleeve and the outer sleeve are connected at least in the region away from the at least one opening by an end wall oriented in the radial direction.

3. The plug-in connection of claim 1, wherein the detent catch spring is U-shaped having parallel legs which form opposing latching elements, with each latching element protruding through a corresponding one of the at least one opening, said corresponding openings being opposite one another.

4. The plug-in connection of claim 3, wherein multiple portions of the catch spring, other than its free ends, extend radially outward through the catch spring openings beyond the outer sleeve; and other portions of the catch spring extend radially inward through the catch spring openings beyond the inner sleeve.

5. The plug-in connection of claim 1, wherein the catch spring includes a detent clip extending through an associated one of the at least one opening and facing an inclined surface of the catch shoulder on the nozzle, said detent clip latching behind the catch shoulder at a third latching location.

6. The plug-in connection of claim 1, wherein the plug further includes a sealing ring with a scaling lip that is angled so as to sealingly contact an inclined surface formed on the catch shoulder.

7. The plug-in connection of claim 1, wherein the inner sleeve and the outer sleeve form a double wall in the region from the at least one catch opening to an end of the plug from which the nozzle is received.

* * * * *